(12) United States Patent
Braunberger et al.

(10) Patent No.: US 8,437,935 B2
(45) Date of Patent: May 7, 2013

(54) ABSOLUTE ACCELERATION SENSOR FOR USE WITHIN MOVING VEHICLES

(75) Inventors: Alfred S. Braunberger, Sequim, WA (US); Beau M. Braunberger, Upland, CA (US)

(73) Assignee: Vision Works IP Corporation, Sequim, WA (US)

( * ) Notice: Subject to any disclaimer, the term of this patent is extended or adjusted under 35 U.S.C. 154(b) by 139 days.

(21) Appl. No.: 12/464,601

(22) Filed: May 12, 2009

(65) Prior Publication Data

US 2010/0217507 A1 Aug. 26, 2010

Related U.S. Application Data

(63) Continuation-in-part of application No. 12/434,577, filed on May 1, 2009, now Pat. No. 8,000,871, which is a continuation of application No. 11/585,401, filed on Oct. 23, 2006, now Pat. No. 7,529,609, which is a continuation-in-part of application No. 11/243,364, filed on Oct. 3, 2005, now Pat. No. 7,239,953.

(60) Provisional application No. 60/616,400, filed on Oct. 5, 2004.

(51) Int. Cl.
    *G06F 7/70* (2006.01)
(52) U.S. Cl.
    USPC ............................................................ 701/70
(58) Field of Classification Search ........................ None
    See application file for complete search history.

(56) References Cited

U.S. PATENT DOCUMENTS

| 4,344,139 | A | * | 8/1982 | Miller et al. ..................... 701/92 |
| 4,349,233 | A | * | 9/1982 | Bullard et al. ................. 303/145 |
| 4,361,871 | A | * | 11/1982 | Miller et al. ..................... 701/92 |
| 4,402,142 | A | | 9/1983 | Dinsmore |
| 4,542,460 | A | * | 9/1985 | Weber .............................. 701/1 |
| 4,779,696 | A | | 10/1988 | Harada et al. |

(Continued)

FOREIGN PATENT DOCUMENTS

| JP | 1030854 A | 2/1989 |
| JP | 1111550 A | 4/1989 |

(Continued)

OTHER PUBLICATIONS

Voevodsky, John, "Evaluation of a Deceleration Warning Light for Reducing Rear-End Automobile Collisions," Journal of Applied Psychology, 1974, vol. 59, No. 3, pp. 270-273.

*Primary Examiner* — Thomas Tarcza
*Assistant Examiner* — Adam Alharbi
(74) *Attorney, Agent, or Firm* — Haverstock & Owens LLP

(57) ABSTRACT

A vehicle monitoring system for turning off an idling engine comprises a vehicle speed sensor configured to detect a lack of motion, or "stationary status" of a vehicle and emit a parameter correlated to the motion status of the vehicle, a transmission status detector configured to detect a transmission status of the vehicle, an alerting device capable of warning other drivers of a stationary status of the vehicle and a control device. The control device is coupled to the vehicle speed sensor, the transmission status detector and the alerting device, wherein the vehicle speed sensor and the transmission status detector send a signal to the control device and the control device operates in a manner dependent on the motion status of the vehicle and the transmission status of the vehicle.

28 Claims, 13 Drawing Sheets

U.S. PATENT DOCUMENTS

| | | | |
|---|---|---|---|
| 5,314,037 A | 5/1994 | Shaw et al. | |
| 5,770,999 A * | 6/1998 | Rhodes | 340/468 |
| 5,831,162 A | 11/1998 | Sparks et al. | |
| 5,856,620 A | 1/1999 | Okada | |
| 6,023,221 A | 2/2000 | Michelotti | |
| 6,073,070 A | 6/2000 | Diekhans | |
| 6,085,133 A | 7/2000 | Keuper et al. | |
| 6,351,211 B1 * | 2/2002 | Bussard | 340/468 |
| 6,411,204 B1 | 6/2002 | Bloomfield et al. | |
| 6,417,764 B2 | 7/2002 | Tonkin | |
| 6,417,767 B1 | 7/2002 | Carlson et al. | |
| 6,459,369 B1 * | 10/2002 | Wang | 340/506 |
| 6,525,652 B2 | 2/2003 | Smith | |
| 6,556,908 B1 | 4/2003 | Lu et al. | |
| 6,647,328 B2 * | 11/2003 | Walker | 701/36 |
| 6,710,709 B1 | 3/2004 | Morin et al. | |
| 6,850,156 B2 | 2/2005 | Bloomfield et al. | |
| 6,856,883 B2 | 2/2005 | Taylor | |
| 7,259,357 B2 * | 8/2007 | Walker | 219/243 |
| 7,418,345 B2 * | 8/2008 | Diebold et al. | 701/301 |
| 7,425,903 B2 * | 9/2008 | Boss et al. | 340/902 |
| 7,427,929 B2 * | 9/2008 | Bauer et al. | 340/905 |
| 7,529,609 B2 | 5/2009 | Braunberger et al. | |
| 7,548,173 B2 * | 6/2009 | Tengler et al. | 340/903 |
| 7,554,435 B2 * | 6/2009 | Tengler et al. | 340/436 |
| 7,782,227 B2 * | 8/2010 | Boss et al. | 340/902 |
| 2001/0056544 A1 * | 12/2001 | Walker | 713/200 |
| 2002/0133282 A1 | 9/2002 | Ryan et al. | |
| 2002/0171542 A1 | 11/2002 | Bloomfield et al. | |
| 2003/0006886 A1 * | 1/2003 | Gabbard | 340/425.5 |
| 2003/0039123 A1 | 2/2003 | Crisick | |
| 2004/0049324 A1 * | 3/2004 | Walker | 701/1 |
| 2004/0160315 A1 | 8/2004 | Speckhart et al. | |
| 2005/0156727 A1 | 7/2005 | Golder | |
| 2005/0223762 A1 * | 10/2005 | Yamamoto | 70/189 |
| 2006/0026017 A1 * | 2/2006 | Walker | 705/1 |
| 2006/0074540 A1 | 4/2006 | Braunberger et al. | |
| 2006/0206246 A1 * | 9/2006 | Walker | 701/16 |
| 2007/0052530 A1 * | 3/2007 | Diebold et al. | 340/467 |
| 2007/0135979 A1 * | 6/2007 | Plante | 701/35 |
| 2007/0135980 A1 * | 6/2007 | Plante | 701/35 |
| 2007/0136078 A1 * | 6/2007 | Plante | 705/1 |
| 2007/0188348 A1 * | 8/2007 | Bauer et al. | 340/905 |
| 2007/0205882 A1 * | 9/2007 | Ehrlich et al. | 340/447 |
| 2007/0219685 A1 * | 9/2007 | Plante | 701/35 |
| 2007/0252723 A1 * | 11/2007 | Boss et al. | 340/902 |
| 2008/0082261 A1 * | 4/2008 | Tengler et al. | 701/210 |
| 2008/0091309 A1 * | 4/2008 | Walker | 701/1 |
| 2008/0111666 A1 * | 5/2008 | Plante et al. | 340/425.5 |
| 2008/0120175 A1 * | 5/2008 | Doering | 705/14 |
| 2008/0122603 A1 * | 5/2008 | Plante et al. | 340/439 |
| 2008/0122605 A1 * | 5/2008 | Tengler et al. | 340/467 |
| 2008/0122652 A1 * | 5/2008 | Tengler et al. | 340/902 |
| 2008/0147266 A1 * | 6/2008 | Plante et al. | 701/35 |
| 2008/0147267 A1 * | 6/2008 | Plante et al. | 701/35 |
| 2008/0288192 A1 * | 11/2008 | Kumar et al. | 702/60 |
| 2008/0316053 A1 * | 12/2008 | Boss et al. | 340/902 |
| 2009/0125170 A1 * | 5/2009 | Noffsinger et al. | 701/20 |
| 2009/0157255 A1 * | 6/2009 | Plante | 701/35 |
| 2009/0242284 A1 * | 10/2009 | Whetstone, Jr. | 180/19.2 |
| 2009/0242285 A1 * | 10/2009 | Whetstone, Jr. | 180/19.2 |
| 2009/0261963 A1 * | 10/2009 | Ault | 340/467 |
| 2010/0063736 A1 * | 3/2010 | Hoetzer | 701/301 |
| 2010/0217507 A1 * | 8/2010 | Braunberger et al. | 701/112 |
| 2010/0318258 A1 * | 12/2010 | Katayama et al. | 701/33 |
| 2010/0332074 A1 * | 12/2010 | Brisighella et al. | 701/33 |
| 2010/0332101 A1 * | 12/2010 | Braunberger et al. | 701/96 |

FOREIGN PATENT DOCUMENTS

| | | |
|---|---|---|
| JP | 1145247 A | 6/1989 |
| JP | 9039655 A | 2/1997 |
| JP | 2001206145 A | 7/2001 |
| JP | 2002240624 A | 8/2002 |
| JP | 2005145333 A | 6/2005 |
| JP | 2006182172 A | 7/2006 |

\* cited by examiner

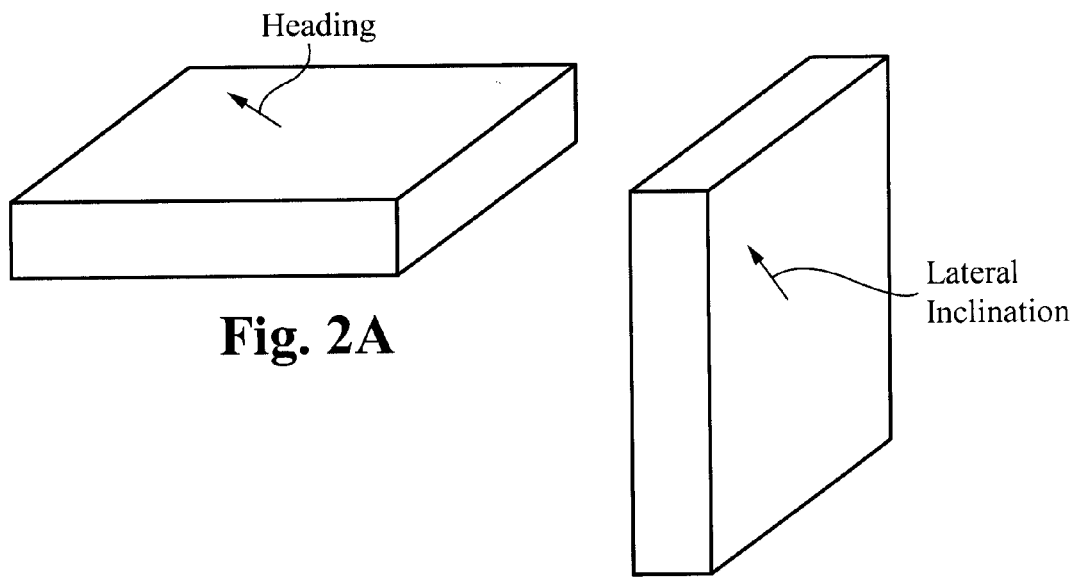
Fig. 2A
Fig. 2B
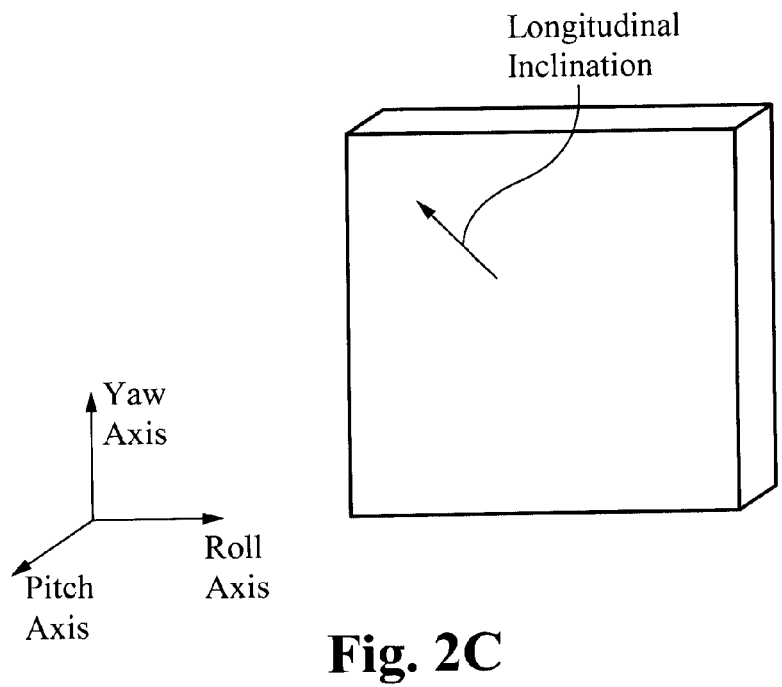
Fig. 2C

ABSOLUTE ACCELERATION SENSOR FOR USE WITHIN MOVING VEHICLES

RELATED APPLICATION

This Patent Application is a continuation-in-part of the U.S. patent application Ser. No. 12/434,577, filed May 1, 2009, and entitled "ABSOLUTE ACCELERATION SENSOR FOR USE WITHIN MOVING VEHICLES," which is hereby incorporated by reference in its entirety, which is a continuation of the U.S. patent application Ser. No. 11/585,401, filed Oct. 23, 2006 and entitled, "ABSOLUTE ACCELERATION SENSOR FOR USE WITHIN MOVING VEHICLES," now issued as U.S. Pat. No. 7,529,609, which is hereby incorporated by reference in its entirety, and which is a continuation-in-part of U.S. patent application Ser. No. 11/243,364, filed Oct. 3, 2005 and entitled, "ABSOLUTE ACCELERATION SENSOR FOR USE WITHIN MOVING VEHICLES", now issued as U.S. Pat. No. 7,239,953 B2, which is hereby incorporated by reference in its entirety, and which claims priority under 35 U.S.C. 119(e) of the U.S. provisional patent application, Application No. 60/616,400, filed on Oct. 5, 2004, and entitled "REAR-END COLLISION AVOIDANCE SYSTEM," which is also hereby incorporated by reference in its entirety.

FIELD OF THE INVENTION

The present invention relates generally to methods and devices for detecting absolute levels of longitudinal, lateral and vertical acceleration within moving vehicles, and to a variety of systems and methods for generating responses to changes in these absolute levels.

BACKGROUND OF THE INVENTION

Accelerometers find a wide variety of applications within modern motor vehicles. The most common of these are impact and collision sensors used to deploy front and side impact air bags in modern passenger cars and trucks.

In applications that depend on sudden and drastic deceleration, the presence of gravity is of little consequence and will not affect the implementation of the accelerometer. However, increasingly feedback systems within motor vehicles have attempted to make use of accelerometer data during much lower and subtler levels of acceleration.

One example is anti-collision warning systems. Though all street legal motor vehicles have brake lamps configured to signal other drivers of braking, these signals do not warn following drivers of imminent braking. At least one system has proposed activating a vehicle's brake lamp system in response to a deceleration signal from a sensitive accelerometer, and independent of actuation of the brake pedal. The system described in U.S. Pat. No. 6,411,204 to Bloomfield et al., entitled "DECELERATION BASED ANTI-COLLISION SAFETY LIGHT CONTROL FOR VEHICLE," includes a plurality of deceleration thresholds each with an associated modulation of the brake lamps.

However, the system fails to precisely account for gravitational forces, limiting its effectiveness to deceleration regimes where gravity's effect is minimal and reducing its effectiveness as an early warning system. Accelerometers, known as tilt sensors in the gaming and robotics industries, are extremely sensitive to any gravitational force to which they are not perpendicular. This sensitivity complicates any system that attempts to detect low levels of acceleration by using accelerometers within moving vehicles, since the system must account for the wide variety of orientations of the accelerometer relative to the earth's gravity introduced as the vehicle travels uphill, downhill, through cambered or off-camber curves, and on cambered grades. For instance, an accelerometer in a vehicle stopped on a 45-degree downhill slope would sense deceleration of a magnitude equal to 0.71 times the acceleration due to gravity. To avoid gravitational acceleration artifacts, the system of Bloomfield only produces output if the deceleration signal rises above a predetermined threshold set above the level of artifacts introduced during typical driving conditions.

However, the reliance of this device on a threshold deceleration reduces its effectiveness as an early warning system. Even a short delay between the time when the subject vehicle begins to slow down and the time when a following vehicle begins to slow can result in a rapid closure of the gap, or following distance, between the vehicles, and a potential collision. Consequently, the shorter the following distance between vehicles, the smaller the margin of error will be for drivers of following vehicles to avoid rear-end collisions. Disengaging the accelerator, or coasting, is often the first response of the driver of a subject vehicle to observing a non-urgent traffic event in the roadway ahead, and usually results in a slight deceleration. By failing to warn other drivers of the possible imminence of braking of a subject vehicle, the proposed device loses valuable time. To avoid this problem, the threshold must be set lower, which could result in gravitational acceleration artifacts affecting the system's output. For example, an overly low threshold could prevent the device from signaling deceleration on an uphill grade since the accelerometer would sense a component of the earth's gravity as acceleration. Similarly, a low threshold could cause the device to continuously flash during a descent, while gravity appears as deceleration.

The loss of time incurred by a threshold-based system might be tolerable in some other application; but in collision prevention, even an instant saved can prevent a collision. A Special Investigative Report issued in January of 2001 by the National Transportation Safety Board (NTSB) illustrates the scale of the problem. The report notes that in 1999 "1.848 Million rear-end collisions on US roads kill[ed] thousands and injur[ed] approximately [one] Million people." The report concluded that even a slightly earlier warning could prevent many rear-end collisions.

Regardless of the individual circumstances, the drivers in these accidents were unable to detect slowed or stopped traffic and to stop their vehicles in time to prevent a rear-end collision. If passenger car drivers have a 0.5-second additional warning time, about 60 percent of rear-end collisions can be prevented. An extra second of warning time can prevent about 90 percent of rear-end collisions. [NTSB Special Investigative Report SIR—01/01, *Vehicle-and Infrastructure-based Technology for the Prevention of Rear-end Collisions*]

In some instances, a motor vehicle will remain running while parked or not in use, in an "idling" state. Common reasons for idling include waiting for a passenger, warming up the vehicle, listening to the radio and convenience. Motor vehicles that remain in an idling state pollute our environment unnecessarily. For example, thirty seconds of idling can use more fuel than turning off the engine and restarting it. Additionally, idling for ten minutes uses as much fuel as traveling five miles. Moreover, one hour of idling burns up to one gallon of fuel and can produce up to 20 lbs of carbon dioxide, which contributes to global warming. Passenger cars, fleet vehicles, diesel trucks, busses and taxi-cabs are all culprits in adding to pollution through unnecessary engine idle.

At present, over 30 states and 900 municipalities have adopted laws restricting the amount of time a stationary vehicle is allowed to idle before being turned off. These laws typically limit the allowable idling time from 1 to 6 minutes before the engine must be turned off and violations can range up to $1,000 per incident. Corporate and government fleet vehicles are most susceptible to such monetary penalties because the aggregate impact of many violations may reside within only one entity.

SUMMARY OF THE INVENTION

In this application "acceleration" refers to either or both positive acceleration and negative acceleration (sometimes called "deceleration"), while "deceleration" refers to only negative acceleration.

The present invention provides systems and methods for warning drivers of other vehicles of any possibility that a subject vehicle will brake and/or that the following vehicle may need to decelerate. This warning occurs earlier than warnings provided by traditional rear brake warning systems. Some embodiments of the present invention take advantage of the existing conditioning of modern drivers to respond quickly to rear brake warning lamps by using these systems to convey new deceleration warnings.

Some embodiments of the present invention relate to devices that overcome the limitations of the prior art by integrating the signals from pulse or sine wave generators, which are directly related to vehicle distance traveled. These devices are commonly referred to as vehicle speed sensors (VSS). Most modern vehicles are shipped with an electronic VSS as standard equipment. The stock VSS communicates with the vehicle's electronic control module (ECM) and speedometer to display the speed of the vehicle to an operator. However, VSS can be installed as aftermarket add-ons.

The embodiments of the present invention involve using signals from a vehicle's VSS to detect deceleration of the vehicle, and modulating warning lights of the vehicle in response to the vehicle's deceleration In some embodiments, the VSS emits a periodic function whose frequency corresponds to the vehicle's speed. For example, some embodiments of the present invention use a VSS that outputs a DC pulse with a frequency that corresponds to the speed of the vehicle. In addition, some embodiments of the present invention use a VSS that outputs an AC sine function with a frequency that corresponds to the speed of the vehicle.

In one aspect, the present invention relates to a vehicle communication system. The vehicle communication comprises the following: a vehicle speed sensor configured to emit a periodic function with a frequency correlated to the speed of the vehicle; an acceleration monitoring system, configured to compute the vehicle's acceleration of the vehicle from the periodic function of the vehicle speed sensor and to output a deceleration status of the vehicle; a braking system engagement detector to detect a braking status of the vehicle; an alerting device capable of signaling other drivers of a deceleration condition of the vehicle; and a control device coupled to the acceleration monitoring system, the braking system engagement detector, and the alerting device, wherein the acceleration monitoring system sends signals to the control device and the control device operates the alerting device in a manner dependent on the deceleration status of the vehicle.

Some embodiments of the present invention relate to a method of alerting drivers in proximity to a vehicle of deceleration and braking of the vehicle. The method includes steps of sensing a speed of the vehicle; producing a periodic function with a frequency correlated to the speed of the vehicle; determining a rate of acceleration of the vehicle based on variations in the periodic function; detecting a braking status of the vehicle; detecting a throttle status of the vehicle; and if the vehicle is decelerating, emitting a signal to indicate that the vehicle is decelerating, wherein the signal varies depending on the rate of deceleration, the braking status, and the throttle status of the vehicle.

In some embodiments, the periodic function emitted by a VSS has a pulse width associated with its frequency. Some embodiments of the present invention measure changes in pulse width to determine deceleration. Some embodiments measure changes in frequency to determine deceleration. Some embodiments incorporate both pulse width and frequency in determining deceleration.

In the embodiments that measure changes in pulse width to determine deceleration, the distance or width between a first pulse and a second pulse is compared to the distance or width between the second pulse and a third pulse. If the width is longer in duration than the previous width then the vehicle is decelerating. If the width is shorter then the previous width then the vehicle is acceleration. If the pulses are equal in width then the speed of the vehicle is constant.

The present invention also provides systems that adjust suspension of a vehicle while turning in response to data from an accelerometer. In some embodiments, a gyroscope is used to detect whether the vehicle is turning or not.

Another aspect relates to a vehicle monitoring system. In this aspect, a vehicle speed sensor (VSS) as described above is used to detect a lack of motion, or "stationary status" of a vehicle. The vehicle monitoring system comprises a VSS configured to emit a periodic function with a frequency correlated to a motion status of the vehicle; a transmission status detector to detect a transmission status of the vehicle; an alerting device capable of warning other drivers of a stationary status of the vehicle and a control device coupled to the VSS, the transmission status detector and the alerting device, wherein the VSS and the transmission status detector send a signal to the control device and the control device operates in a manner dependent on the motion status of the vehicle and the transmission status of the vehicle.

In some embodiments, an emergency brake engagement detector is used to detect an engagement of the emergency brake. In this embodiment, the emergency brake engagement detector is coupled to the control device and the control device further operates in a manner dependent on the status of the emergency brake. In some embodiments, an external temperature sensor is used to detect the temperature of the external operating environment. In this embodiment, the external temperature sensor is coupled to the control device and control device further operates in a manner dependent on the temperature of the external operating environment. In some embodiments, the external temperature is programmable such that a signal is sent to the control device only if the external temperature is above a programmed value.

The vehicle monitoring system further comprises an idling timer which is activated after receiving a frequency correlated to a stationary status of the vehicle. In some embodiments, the idling timer is a distinct microprocessor that is coupled to the VSS and the control device. In some embodiments, the idling timer is a microprocessor comprised within the control device. The idling timer is configured to send a de-activation signal once the timer has reached the end of its pre-programmed period. In some embodiments, the idling timer is pre-programmed to send a de-activation signal after 1, 3, 6 or 9 minutes. In some embodiments, the idling timer is pre-programmed to send a de-activation signal after some other period of time.

Another embodiment relates to a method of automatically turning off an idling engine of a vehicle. The method comprises the steps of sensing a stationary status of the vehicle, activating an alert device to alert other drivers that the vehicle is stationary, activating an idling timer and detecting a transmission park-status of the vehicle, wherein if the vehicle is stationary, the alert device to alert other drivers that the vehicle is stationary and the idling timer are activated, wherein the idling timer is configured to send a de-activation signal once the timer has reached the end of its pre-programmed period and the transmission park-status of the vehicle is confirmed.

In some embodiments, the method further comprises an emergency brake engagement detector to detect the engagement of the emergency brake, wherein the deactivation signal is not sent until the engagement of the emergency brake is confirmed. In some embodiments, the method further comprises an external temperature sensor to detect the temperature of the external operating environment, wherein the deactivation signal is not sent unless the external temperature is above a programmed value.

After the transmission park-status of the vehicle is confirmed, any number of redundant queries may be repeated after which a signal is sent to turn off the engine. In some embodiments, the transmission park-status of the vehicle is confirmed before the end of the idling timer's pre-programmed period. In some embodiments, a logic high or a logic low signal is sent directly to the control device which turns off the engine. In another embodiment, a 12V signal is sent to a relay, which resides in series with the ignition system. Receiving the 12V signal actuates the relay and disengages the ignition. In further embodiments, additional signals are sent to relays to turn off a lighting system or other accessory equipment.

BRIEF DESCRIPTION OF THE DRAWINGS

FIG. 2A illustrates a gyroscope positioned for measuring a heading, and included in an accelerometer-gyroscopic sensor in accordance with an embodiment of the present invention.

FIG. 2B illustrates a gyroscope positioned for measuring a lateral inclination, and included in an accelerometer-gyroscopic sensor in accordance with an embodiment of the present invention.

FIG. 2C illustrates a longitudinal inclination, and included in an accelerometer-gyroscopic sensor in accordance with an embodiment of the present invention.

DETAILED DESCRIPTION OF THE INVENTION

Figure 1A:
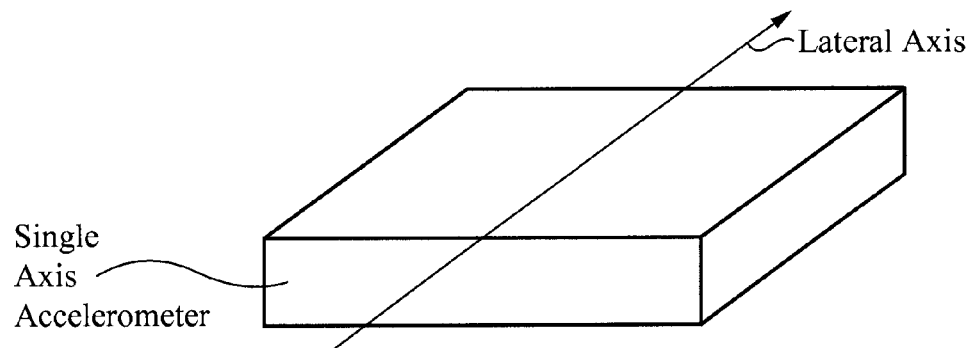
FIG. 1A illustrates a single axis accelerometer positioned for measuring lateral acceleration, and included in an accelerometer-gyroscopic sensor in accordance with an embodiment of the present invention.
Figure 1B:
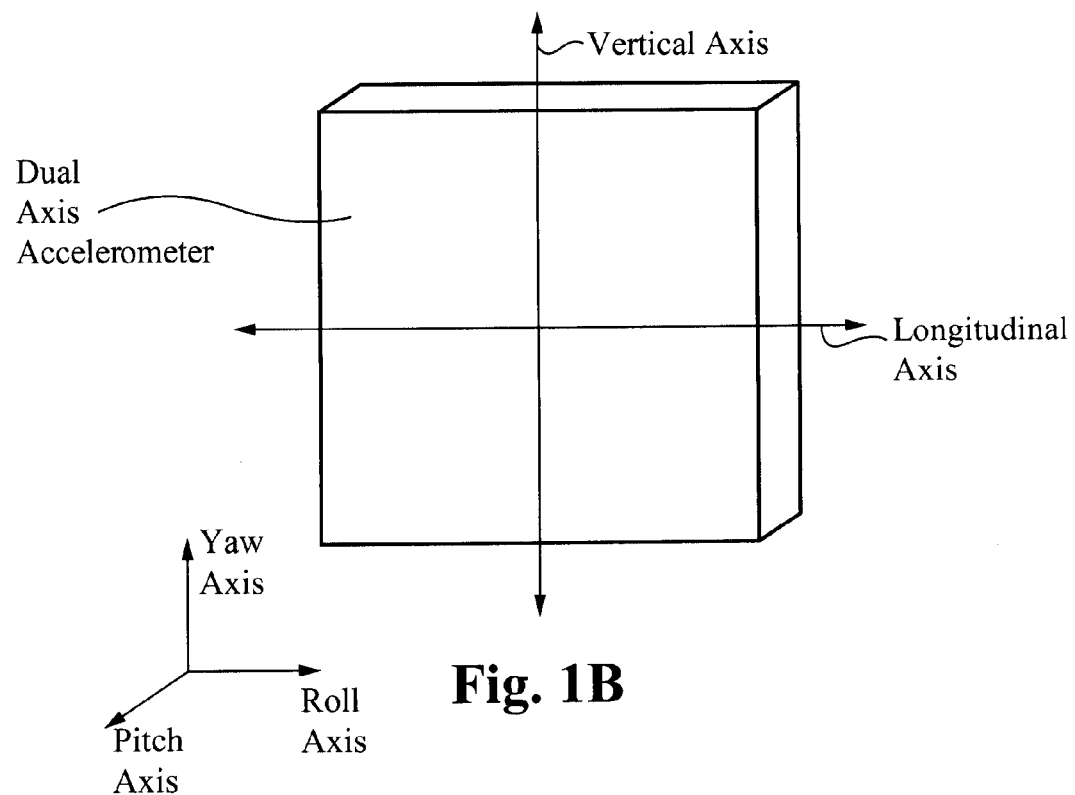
FIG. 1B illustrates a dual axis accelerometer positioned for measuring vertical and longitudinal acceleration, and included in an accelerometer-gyroscopic sensor in accordance with an embodiment of the present invention.

As shown in FIGS. 1B and 2C, one embodiment of the present invention includes a dual axis accelerometer and an electronic gyroscope positioned upon a moving body (not shown) having a pitch axis and a yaw axis that form a pitch-yaw plane as illustrated, which attempts to move along a movement vector orthogonal to the pitch-yaw plane. A first axis, termed the longitudinal axis, of the dual axis accelerometer is placed orthogonal to the plane of the pitch and yaw axes to sense acceleration along the movement vector. A second axis, termed the vertical axis, of the accelerometer is placed parallel with the yaw axis (and thus perpendicular to the movement vector) to sense acceleration along the yaw axis. Thus the two axes of the accelerometer form a longitudinal-vertical plane orthogonal to the pitch-yaw plane.

The gyroscope in FIG. 2C is mounted parallel to the longitudinal-vertical plane of the accelerometer and thus is also along a plane perpendicular to the pitch-yaw plane of the moving body. This configuration allows it to sense an inclination of the movement vector of the moving body relative to the gravitational acceleration acting on the body.

In some embodiments of the present invention, an accelerometer is used to detect additional types of movement. The orientation shown in FIG. 1A allows for detection of lateral acceleration. In FIG. 1A, a single axis accelerometer configured with a first axis, termed the lateral axis, parallel to the pitch axis senses lateral acceleration of the body, e.g. acceleration in a plane orthogonal to the longitudinal-vertical plane.

When the body does undergo a lateral acceleration, its actual movement is no longer along the desired movement vector. Thus, during lateral acceleration, another gyroscope can be included to sense the inclination of the component of the actual movement vector that lies along the lateral axis. FIG. 2B depicts a gyroscope configured parallel to the pitch-yaw plane and thus configured to detect an inclination of the component of movement that lies along the lateral axis, termed the lateral inclination of the body.

In some embodiments, the system also includes another gyroscope that is configured parallel to the lateral-longitudinal plane (in which all desirable movement vectors will lie), to detect a heading of the body. This additional gyroscope is required for those embodiments that supply supplemental data to navigation systems.

The embodiments of the present invention include logic circuits configured to receive signals of acceleration along the lateral, longitudinal, and vertical axes, as well as of the lateral and longitudinal inclinations and the heading, if necessary and to process these signals to produce a variety of output signals indicating characteristics of the moving body's movement. In some embodiments, these include: absolute longitudinal acceleration (both positive and negative), absolute vertical acceleration (both positive and negative), absolute lateral acceleration (both positive and negative), heading, and actual speed.

Though accelerometers are inherently stable, and especially so when internally temperature compensated, gyroscopes, both mechanical and electronic, can suffer from instability and drift. Because of these drift characteristics, gyroscopes typically require periodic auto-zeroing or re-referencing to provide reliable output.

In some embodiments of the present invention, a method of detecting an absolute deceleration includes steps of re-referencing. This task is able to be accomplished using signals from the accelerometers, but in other embodiments use a Hall effect, electronic or other type of compass.

Re-referencing is able to take place periodically; for systems using Hall effect or some other independent compass, the systems simply re-reference at specified heading or timing intervals. However, in some embodiments, systems that use accelerometer data for re-referencing are more careful. When stationary, any signal from the accelerometer is essentially representative of the earth's gravity, this signal can provide an initial reference for any gyroscopes included in the present invention, which is able to take place prior to movement of the body.

Once the body has begun moving, without periodic re-referencing, the gyroscope output can become unreliable. The present invention teaches several methods of re-referencing during travel. Some of these are only applicable to travel that includes periodic stops. For example, the vertical or lateral axis accelerometers can be used to detect whether the body is stopped. When it is stopped, the signal from the longitudinal axis of the accelerometer can be used to re-reference the gyroscope. Further, at any point during travel when no acceleration has been detected for a predetermined period of time the gyroscope can be re-referenced. In this way repeated referencing can occur even during extended travel without any stops.

In some embodiments, the present invention is implemented in a vehicle, and the following embodiments of the present invention are described relative to a vehicle. However, the methods and systems taught by the present invention can be implemented in a wide variety of moving bodies other than vehicles.

EXAMPLE 1

Rear End Collision Avoidance

Figure 3A:
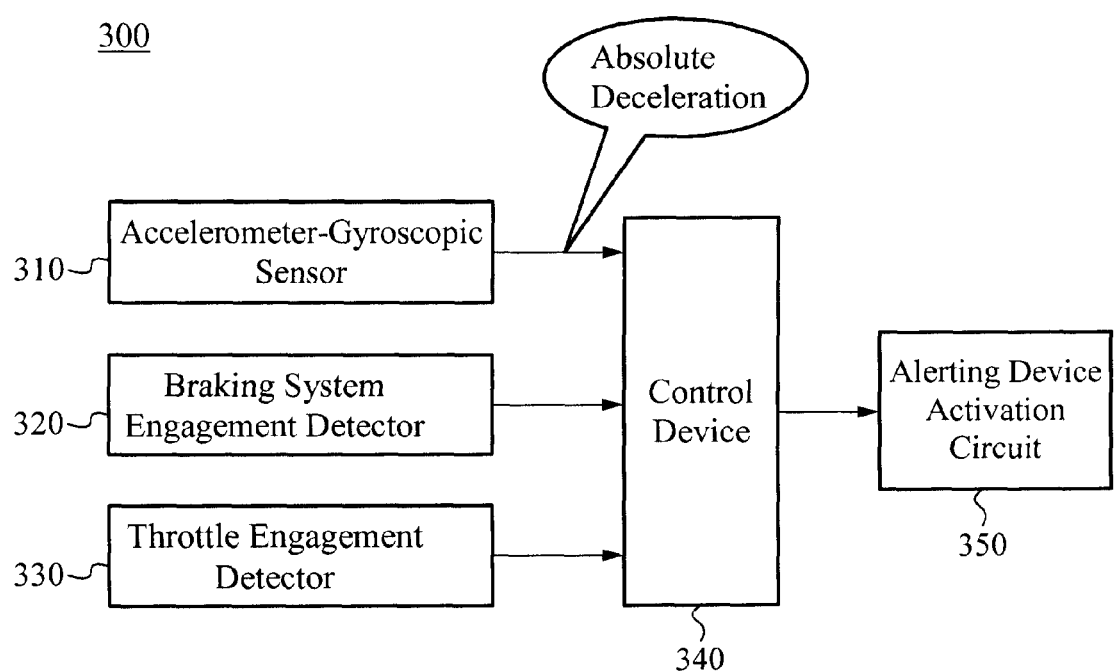
FIG. 3A is a schematic view illustrating the components of the rear-end collision avoidance system, warning drivers of a subject vehicle's deceleration, in accordance with an embodiment of the present invention.

FIG. 3A is a schematic view illustrating the components of the rear-end collision avoidance system 300, warning drivers of a subject vehicle's deceleration, in accordance with one embodiment of the present invention. The rear-end collision avoidance system 300 comprises an accelerometer-gyroscopic sensor 310, a braking system engagement detector 320, a throttle engagement detector 330, and a control device 340. The accelerometer-gyroscopic sensor 310 is coupled to the control device 340, detects an absolute longitudinal deceleration of the vehicle, and sends a signal to the control device 340. The braking system engagement detector 320 is also coupled to the control device 340, detects any engagement of the braking system of the vehicle, and sends a signal to the control device 340. The throttle engagement detector 330 is also coupled to the control device 340 and detects engagement of the throttle. In alternative embodiments, the present invention also includes additional input devices, such as a clutch engagement detector configured to relay a clutch status to the control device 340. Next, the control device 340 processes the input signals it receives from the accelerometer-gyroscopic sensor 310, the braking system engagement detector 320, and the throttle engagement detector 330 and decides whether to activate an alerting device of the vehicle. In some embodiments the control device 340 only activates an alerting device if the vehicle is throttled down but not braking In some embodiments, the control device 340 activates the alerting device only if the absolute longitudinal deceleration is non-zero. In one embodiment, the communication system further comprises an alerting device activation circuit 350, wherein the control device 340 is coupled to and sends signals to the alerting device activation circuit 350, which activates an alerting device based on a signal from the control device 340.

Figure 9:
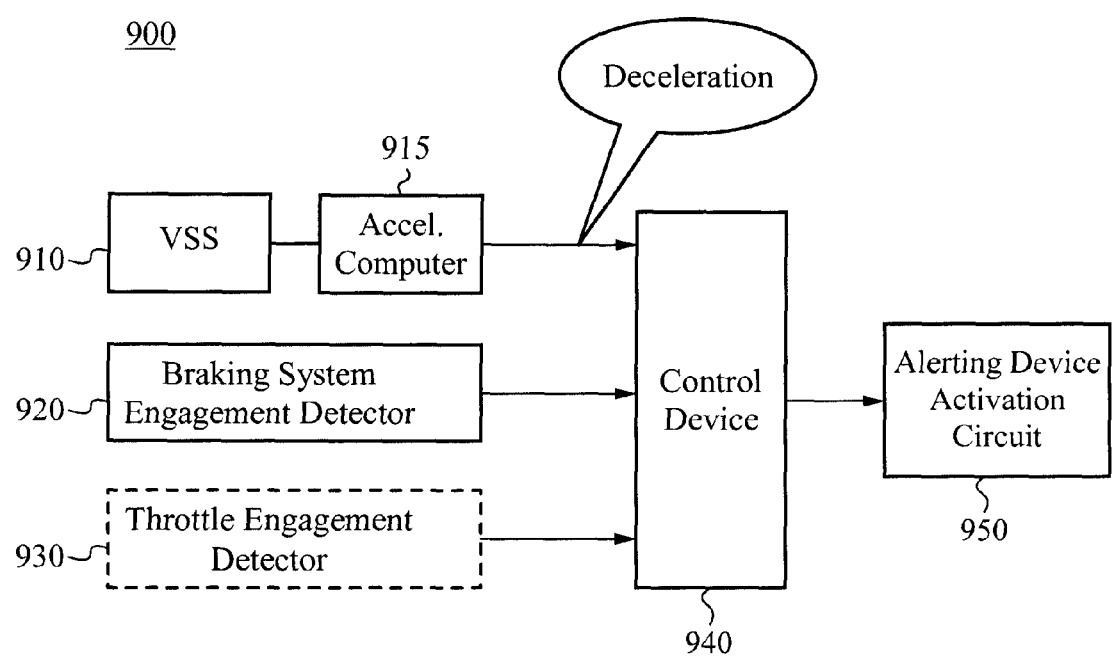
FIG. 9 is a schematic view illustrating the components of the rear-end collision avoidance system, warning drivers of a subject vehicle's deceleration, in accordance with some embodiments of the present invention.

In some other embodiments, input from a vehicle speed sensor (VSS) is used to perform a similar function. FIG. 9 is a schematic view illustrating the components of the rear-end collision avoidance system 900, warning drivers of a subject vehicle's deceleration, in accordance with one embodiment of the present invention. The rear-end collision avoidance system 900 comprises a vehicle speed sensor 910, an acceleration monitoring system 915, a braking system engagement detector 920, and a control device 940. It can also include a throttle engagement detector 930.

The vehicle speed sensor 910 is coupled to the acceleration monitoring system 915, which is coupled to the control device 940. The vehicle speed sensor 910 detects a speed of the vehicle and emits a periodic function with a frequency that is correlated to the speed of the vehicle. The acceleration monitoring system 915 uses variations in the periodic function to calculate the acceleration (or deceleration) of the vehicle. The acceleration monitoring system 915 sends a signal to the control device 940 that represents deceleration of the vehicle. The braking system engagement detector 920 is also coupled to the control device 940, detects any engagement of the braking system of the vehicle, and sends a signal to the control device 940. If present, the throttle engagement detector 930 is also coupled to the control device 940 and detects engagement of the throttle. In alternative embodiments, the present invention also includes additional input devices, such as a clutch engagement detector configured to relay a clutch status to the control device 940. Next, the control device 940 processes the input signals it receives from the acceleration monitoring system 915, the braking system engagement detector 920, and the throttle engagement detector 930 and decides whether to activate an alerting device of the vehicle. In some embodiments the control device 940 only activates an alerting device if the vehicle is throttled down but not braking In some embodiments, the control device 940 activates the alerting device only if the absolute longitudinal deceleration is non-zero. In one embodiment, the communication system further comprises an alerting device activation circuit 950, wherein the control device 940 is coupled to and sends signals to the alerting device activation circuit 950, which activates an alerting device based on a signal from the control device 940.

Some embodiments use a microprocessor or micro-controller as the acceleration monitoring system 915 to measure pulse width differentials between consecutive pulses. If the periodic function produced by the VSS is a DC pulse, only one wire is needed to interface with the VSS 910. If the periodic function is an AC sine wave two wires are used.

The functions of an embodiment illustrated with reference to FIG. 9 are performed in a module that contains various discrete electronic components involved in signal conditioning as well as a microprocessor or microcontroller, which would actually do the computations. These include one or more of the following: a microprocessor, interpreter, voltage regulator, RAM, EEPROM, resonator and communication port and circuitry along with various filtering and voltage protection circuitry. In some embodiments, the module is capable of accurately measuring and comparing pulse widths of 1 millionth of a second or less and frequencies of zero (0) to mega hertz all within time frames of micro to milliseconds. The present invention can be implemented in an analog, electromechanical, or a digital circuit including programmable elements.

In addition, in some embodiments the various embodiments described above are implemented in a module that includes a separate aftermarket VSS. These embodiments are advantageous when used to retrofit older vehicles that do not come with a VSS as original equipment.

In addition, some embodiments use an aftermarket VSS, even on newer vehicles. For example, one such VSS comprises a sensor configured to detect rotation of the universal joint of a motor vehicle.

In this embodiment, a sensor is mounted on either the rear-end housing or on the back end of the transmission and where the sensor is positioned over the universal joint. The sensor would not be in contact with the spinning universal joint but in close proximity, e.g. ⅛ or ¼ inch air gap.

In some embodiments, the sensor is configured to sense ferrous metal. Thus, there is no need to affix anything to the actual spinning universal joint. Universal joint typically have four protrusions. The sensor is optionally configured to sense either two or four of the protrusions. The resultant signal represents variations in the magnetic flux field produced by the sensor each time a protrusion passes through the magnetic field One type of sensor used in some embodiments of the present invention comprises a coil with or without a core. When a voltage is applied to the coil, a magnetic flux field is produced around the coil. If a ferrous metal object passes through that field it robs just a little of the power (which is stored in the field) resulting in a change in the current and voltage within the coil and conductor feeding the coil. This signal is then used to produce a square wave.

The embodiments of the present invention include input devices. Those mentioned above include braking system engagement detectors, throttle engagement detectors, the accelerometer-gyroscopic sensor, and VSS/acceleration monitoring systems. In alternative embodiments, the present invention also includes additional input devices, such as a clutch engagement detector configured to relay a clutch status to the control device.

The embodiments of the presently claimed invention include alerting devices. In some embodiments, an alerting device comprises lamps on the vehicle that are capable of flashing and emitting visible light. In one aspect, the lamps of the alerting device flash only at a constant rate, while in another aspect the lamps flash at a variable rate, and further wherein the control device is configured to flash the lamps at a rate correlated to a rate of deceleration. In some embodiments, the lamps are one of the following: conventional signaling lamps and conventional brake lamps. However, in another embodiment, the alerting device is a radio frequency (RF) transmitter capable of directing RF signals from the rear of the vehicle to a following vehicle. In other embodiments, the alerting device uses other types of signals.

For example, in some other embodiments, the signaling lamps used comprise bi-color light emitting diodes (LED). In these embodiments, the bi-color LEDs change color depending on the polarity of the current used to energize them. Thus, the control device in these embodiments is configured to provide current to the bi-color LEDs with a polarity that varies depending on the signal to be sent. For example, in one embodiment the control device leaves the bi-color LEDs unenergized when no deceleration is occurring and the brakes are not engaged, provides a current with a polarity to cause the bi-color LEDs to emit a yellow light upon deceleration, and to provide a current with a polarity to cause the bi-color LEDs to emit a red light upon braking.

When used in this patent, the terms "conventional signaling lamps" and "conventional brake lamps" refer to signaling or brake lamps included on motor vehicles during their original manufacture. The present invention also contemplates signaling by using after-market devices that are attached to a vehicle in addition to conventional signaling and brake lamps.

A communication system can be embodied as an aftermarket add-on product or as an original vehicle system. These embodiments include different types of controllers. In some embodiments of an add-on system, a control device does not interfere with the existing brake lamp system controller. The control device communicates with the brake lamps in a substantially separate manner from the existing brake lamp control system. Control devices used in the present invention could include relays, switches or micro controllers. In one aspect, an aftermarket system can continuously power the alerting device activation circuit without need of an intermediate control device.

However, in an original equipment system, a communication system in accordance with the present invention is able to include a control device that further comprises a control system for the conventional brake lamp system, whereby the communication system is an integrated control and circuitry system for all brake lamps. In this aspect, a single control system accomplishes the tasks of conventional brake signaling and the signaling described in the present invention.

During operation, the communications system of the present invention uses information from the various input devices to determine a manner in which to operate an alerting device. In one aspect, the communications system continuously modulates the alerting device based on the accelerometer-gyroscopic sensor's input so long as the throttle is disengaged, regardless of braking system status. In another aspect, once the braking system is engaged, the communications system activates the alerting device continuously until disengagement of the braking system, whereupon the communications system once again considers throttle and the accelerometer-gyroscopic sensor's input in choosing a manner in which to operate the alerting device. In a third aspect, where a conventional braking system exists separately from a communications system as described in the present invention, the control device deactivates in response to braking system engagement and reactivates upon braking system disengagement. In some embodiments, the control device receives input in cycles and makes a determination for operation of the alerting device within each cycle.

In one embodiment, the control device 940 takes input from the acceleration monitoring system 915, the braking system engagement detector 920, and the throttle engagement detector 930 in cycles that are substantially continuous in time. In some embodiments, for each cycle, the control device 940 enters one of four states: I) it does not activate an alerting device for the entirety of the cycle, II) it activates an alerting device for the entirety of the cycle, III) it activates an alerting device at least once for a period of time that is short relative to the duration of the cycle; or IV) it activates an alerting device multiple times during the cycle.

Figure 3B:
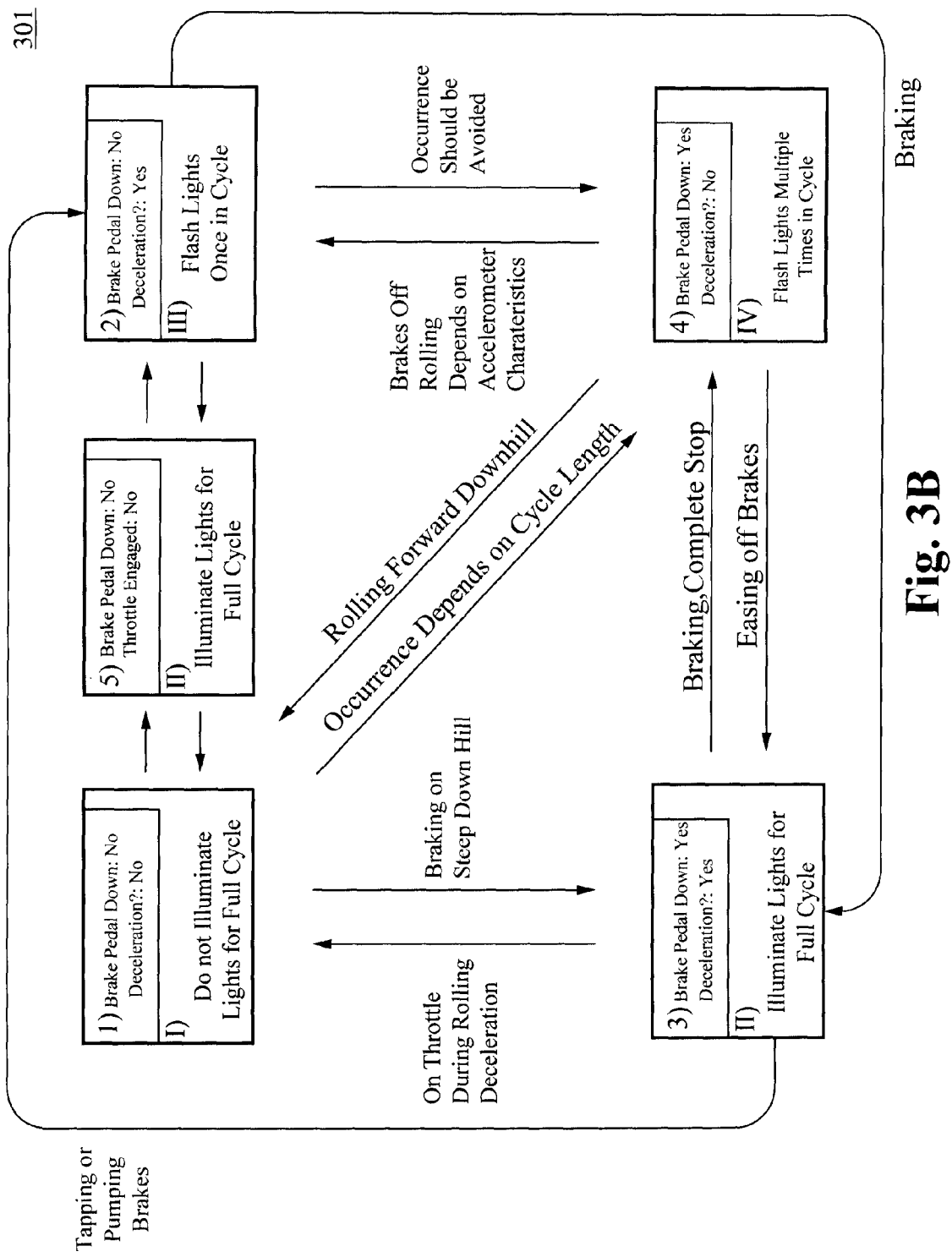
FIG. 3B illustrates a state machine diagram of the control device in accordance with some embodiments of the present invention.

FIG. 3B illustrates an embodiment in which these four output states are handled. A state machine 301, included in a control device in accordance with the present invention, takes five possible input states, for four of them throttle status is not considered: 1) brake pedal is not depressed, deceleration is not detected; 2) brake pedal is not depressed, deceleration is detected; 3) brake pedal is depressed, deceleration is detected; or 4) brake pedal is depressed, deceleration is not detected. State 5) only occurs if the throttle is disengaged, and if the brake pedal is not depressed. Input state 1 corresponds to output state I, input state 2 corresponds to output state III, input states 3 and 5 correspond to output state II, and input state 4 corresponds to output state IV.

Transitions between all input states are handled and every transition is a plausible outcome of a braking or acceleration event. For example, a driver disengaging the throttle pedal causes a transition from state 1 to state 5. In the first cycle detecting state 5, the brake lamps are illuminated. Once a required level of deceleration is detected, a transition from state 5 to state 2 occurs. In the first cycle detecting state 2, the brake lamps are flashed, or another alerting device is activated, corresponding to output state III. A transition from state 1 directly to state 2 can occur when beginning ascent of a steep grade: the throttle is engaged, the brake pedal is disengaged but the vehicle begins to decelerate.

If the driver engages the throttle again, or in the case of an ascent, increases the throttle, a transition from state 5 to state 1, or state 2 to state 1, occurs. If the driver subsequently depresses the brake pedal, a transition from state 2, or state 5, to state 3 occurs. While the brake pedal is depressed, state II output keeps the brake lamps illuminated. Furthermore, while the brake pedal is depressed, a transition from state 3 to state 4 may occur. In this embodiment, in state 4 the lamps are flashed at an increased rate. Whenever the brake pedal is depressed, state II or IV output occurs and accelerometer-gyroscopic sensor data is effectively ignored. When the brake pedal is released, one of input state 1, input state 2, and input state 5 are entered.

A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Figure 3C:
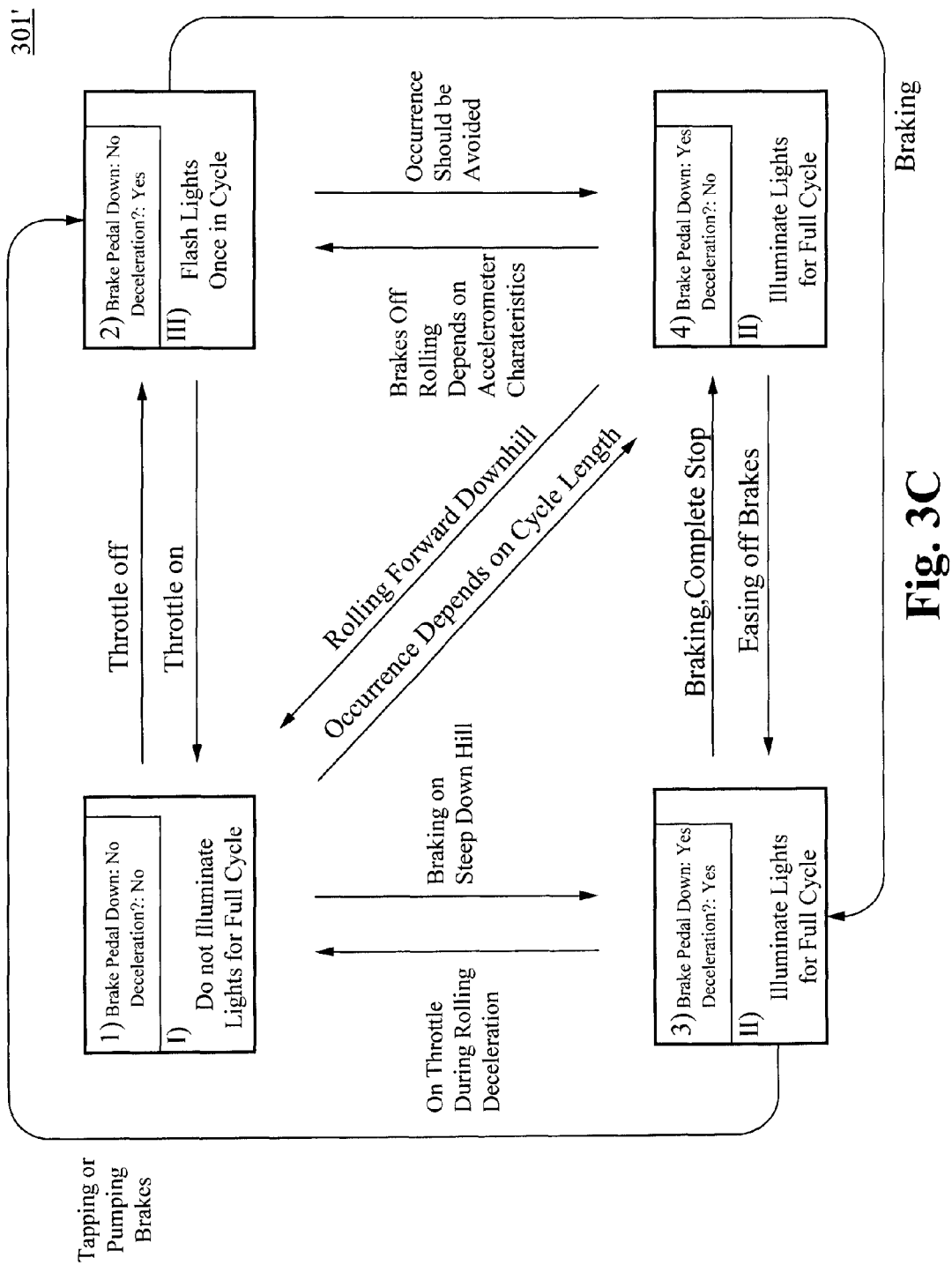
FIG. 3C illustrates a state machine diagram of the control device in accordance with an alternative embodiment of the present invention.

In the alternative embodiment illustrated in FIG. 3C, a state machine 301' included in a control device in accordance with the present invention, the system only considers the first three states. The state machine 301' takes four possible input states: 1) brake pedal is not depressed, deceleration is not detected; 2) brake pedal is not depressed, deceleration is detected; 3) brake pedal is depressed, deceleration is detected; or 4) brake pedal is depressed, deceleration is not detected. Input state 1 corresponds to output state I, input state 2 corresponds to output state III, and input states 3 and 4 correspond to output state II.

Transitions between all input states are handled and every transition is a plausible outcome of a braking or acceleration event. For example, a driver taking his or her foot off the accelerator pedal causes a transition from state 1 to state 2. In the first cycle detecting state 2, the brake lamps are flashed, or other alerting means are activated, corresponding to output state III. This transition from state 1 to state 2 also occurs when beginning ascent of a steep grade: the accelerator is depressed, the brake pedal is disengaged but the vehicle begins to decelerate. If the driver presses the accelerator again, or in the case of an ascent, further depresses the accelerator, a transition from state 2 to state 1 occurs. If the driver subsequently depresses the brake pedal, a transition from state 2 to state 3 occurs. While the brake pedal is depressed, state II output keeps the brake lamps illuminated. Furthermore, while the brake pedal is depressed, a transition from state 3 to state 4 may occur. In this embodiment, such a transition results in no change in output. Whenever the brake pedal is depressed, state II output occurs and accelerometer-gyroscopic sensor data is effectively ignored. When the brake pedal is released, either input state 1 or input state 2 is entered.

In some embodiments a transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Embodiments of the present invention provide the driver of a subject vehicle a communication system that provides warning signals to other vehicles of any deceleration or possibility of braking of the subject vehicle. One novel and distinguishing feature of this invention is that the subject vehicle's communication system warns other vehicles of any possibility that the subject vehicle will begin to brake. This is so because any engagement of the brake pedal is usually immediately preceded by a disengagement of the throttle.

Thus, this invention provides an earlier warning to the driver of the following vehicle of a subject vehicle's intent to decelerate than is currently available in modern vehicles, which only provide systems that actuate warning lamps if the driver depresses the brake pedal or if an accelerometer unit detects a threshold deceleration. Modern drivers respond quickly to rear brake warning lamps, conditioning that the present invention takes advantage of by using these warning systems to convey new and broader warnings. Since following distances on modern roadways are often inadequate, this arrangement could prevent numerous rear-end collisions.

EXAMPLE 2

Anti-Rollover Systems

In some embodiments of this invention, outputs from the sensing of absolute lateral acceleration are used to adjust suspension systems by stiffening outside suspension and/or loosening inside suspension of moving vehicles. Further, in some other embodiments, simple lateral acceleration is used to adjust suspension systems during turning.

When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

The above can be accomplished either with an absolute lateral acceleration signal and a gyroscopic correction, or with an uncorrected lateral acceleration signal. In the latter scenario, an accelerometer mounted to sense lateral acceleration also detects a component of gravitational acceleration during a banked turn. The strength of the gravitational component relative to the lateral (centrifugal) acceleration will depend on the speed of the turn. Correction to the suspension system is performed accordingly. In addition, this type of suspension adjustment system could be used only when the vehicle is turning. A gyroscope mounted in the horizontal plane to sense heading (e.g. FIG. 2A) could be used to sense whether the vehicle is turning or not. In Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

Figure 4:
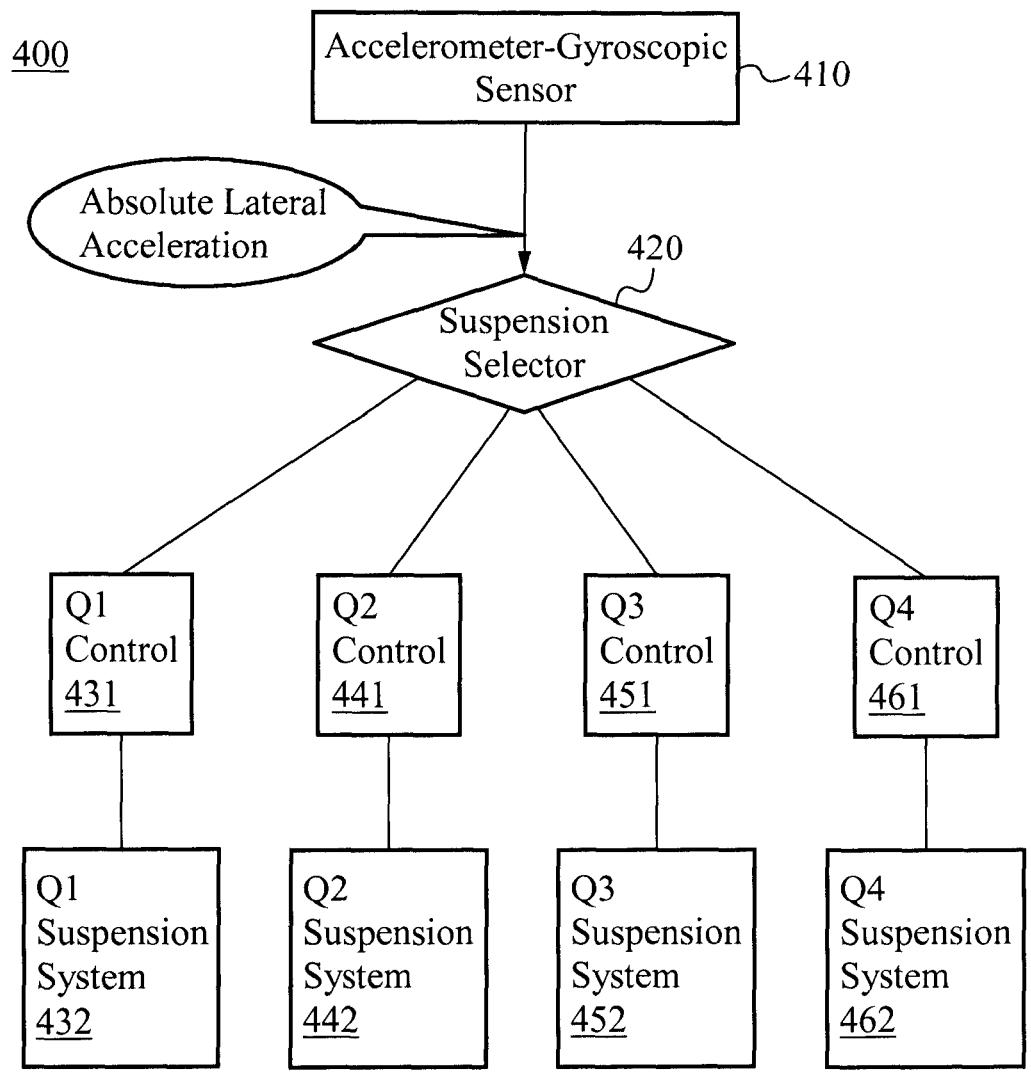
FIG. 4 illustrates a schematic view of an anti-rollover system in accordance with an embodiment of the present invention.

An anti-rollover device 400 using an absolute acceleration signal is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

Figure 8:
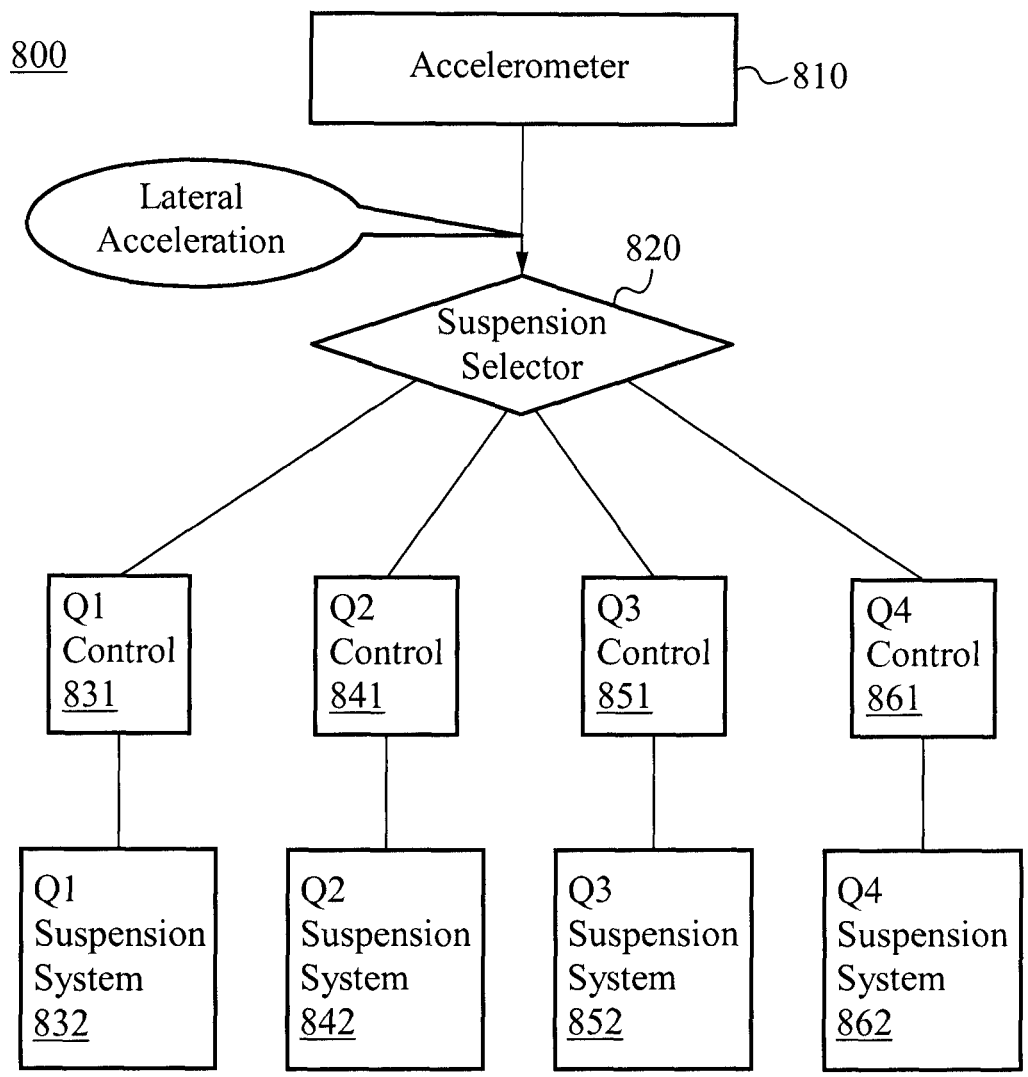
FIG. 8 illustrates a schematic view of an anti-rollover system in accordance with an embodiment of the present invention.

An anti-rollover device 800 using a lateral accelerometer is illustrated in FIG. 8. In this embodiment vehicles are assumed to be equipped with adjustable suspension systems, typically hydraulic or pneumatic. When lateral acceleration is sensed the accelerometer 810 sends a signal representing lateral acceleration to a suspension selector 820, which passes signals along to a controller responsible for controlling the relevant quadrant of the suspension. The suspension selector 820 must interpret the signal to determine the appropriate quadrant. For example, Q1, in which suspension system 832 is controlled by suspension control 831 could be the right front wheel; Q2, in which suspension system 842 is controlled by suspension control 841 could be the left front wheel; Q3, in which suspension system 852 is controlled by suspension control 851 could be the right rear wheel; and Q4, in which suspension system 862 is controlled by suspension control 861 could be the left rear wheel. Of course, other orderings are possible, as are systems with only two independent zones, e.g. two sides are controlled in lockstep.

EXAMPLE 3

Performance Monitoring Systems

Due to fuel efficiency goals and competitive pressures late model vehicles have the ability to monitor engine system performance through an array of sensors and detectors. The absolute accelerometer/gyroscope combination provides the ability to communicate actual power-to-the-ground data for use in engine/vehicle performance computations. In this embodiment, the accelerometer-gyroscopic sensor continuously sums absolute acceleration values to provide both absolute acceleration and actual speed values, which can be used by a manufacturers vehicle computer unit (VCU).

Figure 5:
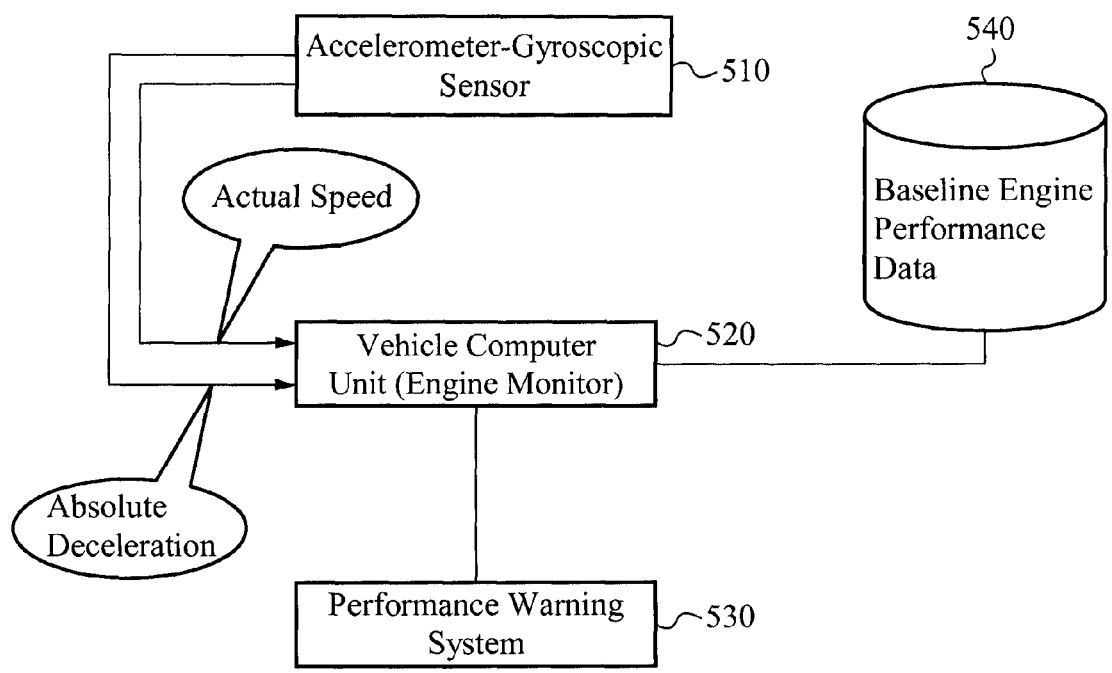
FIG. 5 illustrates a schematic view of an engine performance monitoring system in accordance with an embodiment of the present invention.

For example, the system 500 shown in FIG. 5 includes the accelerometer-gyroscopic sensor 510, which delivers actual speed data and absolute acceleration data to a vehicle computer unit (VCU) 520 (or at least the engine monitoring portion thereof). The VCU 520 uses baseline engine performance data 540 to either self-correct through a feedback mechanism, or to issue a warning through the performance warning system.

The manufacturer's baseline engine performance data is helpful in determining how much acceleration should be achieved for a given amount of throttle and what the speed of the vehicle should be for a given amount of throttle. For instance, a VCU may have tuned to maximum efficiency however the vehicle's corresponding speed or acceleration may be many percentage points less than what would be expected, indicating perhaps that the tire pressure is low or that the vehicle is loaded to a higher level than what would be normal, in which case the tire pressure should be increased.

EXAMPLE 4

Road or Suspension Condition Monitoring Systems

Because an accelerometer-gyroscopic sensor, which is used and is part of this invention can use one axis of a dual axis accelerometer in the vertical position vertical acceleration output signals are made available to other monitors or computers that require this information. Such a requirement may be to monitor and evaluate road quality and/or shock absorber utilization and performance. For instance, it is apparent to a rider in a vehicle when such vehicle is riding on worn out shock absorbers. However, it becomes less apparent when those shock absorbers wear out slowly over an extended period of time. The first time a driver may realize that shock absorbers have worn out is in cases where critical performance is required. Or when they replace worn out tires and see the evidence on tires of worn out shock absorbers. The absolute A/G sensor detects vertical acceleration in very small increments. Increasing levels of vertical acceleration can easily be monitored thus providing notice to drivers of the degradation of shock absorber system.

Figure 6:
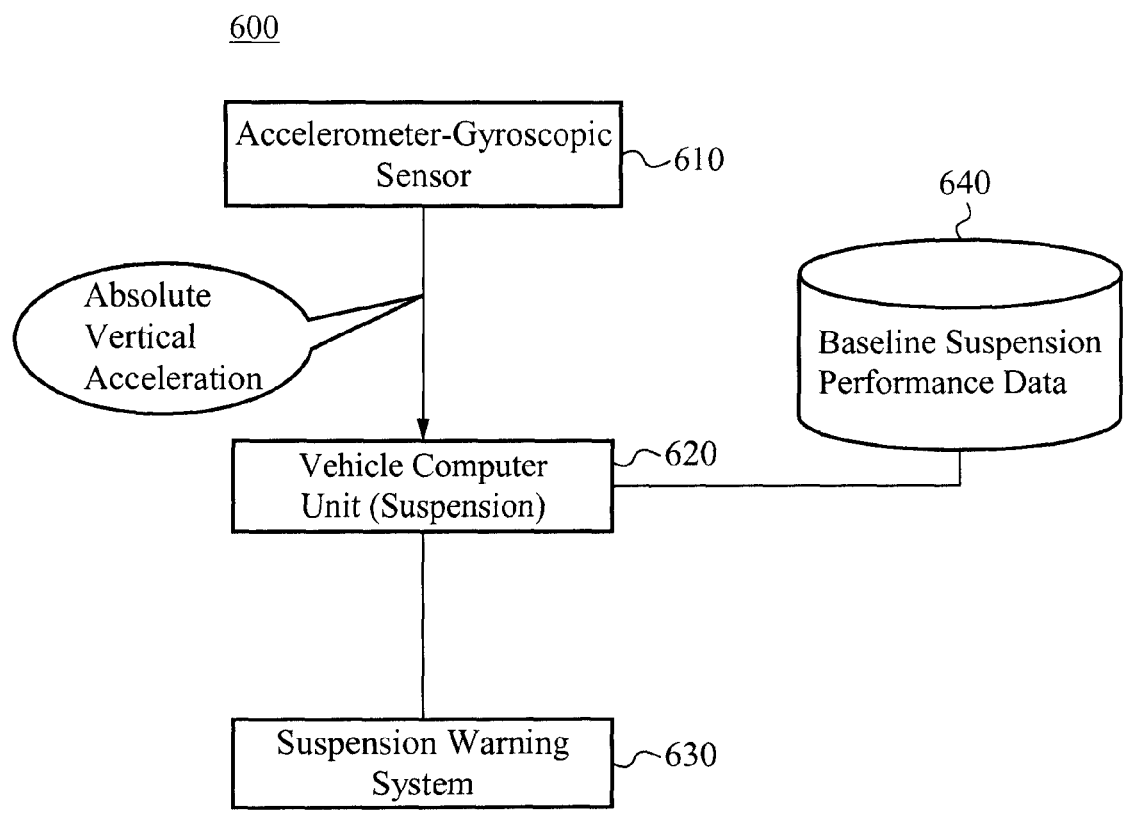
FIG. 6 illustrates a schematic view of a suspension and road condition monitoring system in accordance with an embodiment of the present invention.

For example, in the system 600 shown in FIG. 6, the accelerometer-gyroscopic sensor 610 provides absolute vertical acceleration data to a VCU 620 or at least a suspension-monitoring portion thereof. The VCU 620 can use baseline suspension performance data 640 to either self-correct through a feedback mechanism or issue a warning through the suspension warning system 630.

EXAMPLE 5

Navigation Systems

In most embodiments, the accelerometer-gyroscopic sensor is continuously monitoring acceleration; a unit of acceleration multiplied by a unit of time yields a unit of velocity (with speed as its magnitude). In some embodiments, the accelerometer-gyroscopic sensor continuously sums units of acceleration over small increments of time. In this case, the accelerometer-gyroscopic sensor provides the integrated velocity or speed as an output. In some embodiments, when a horizontally mounted gyroscope is incorporated, the accelerometer-gyroscopic sensor also provides direction or heading as an output.

Figure 7:
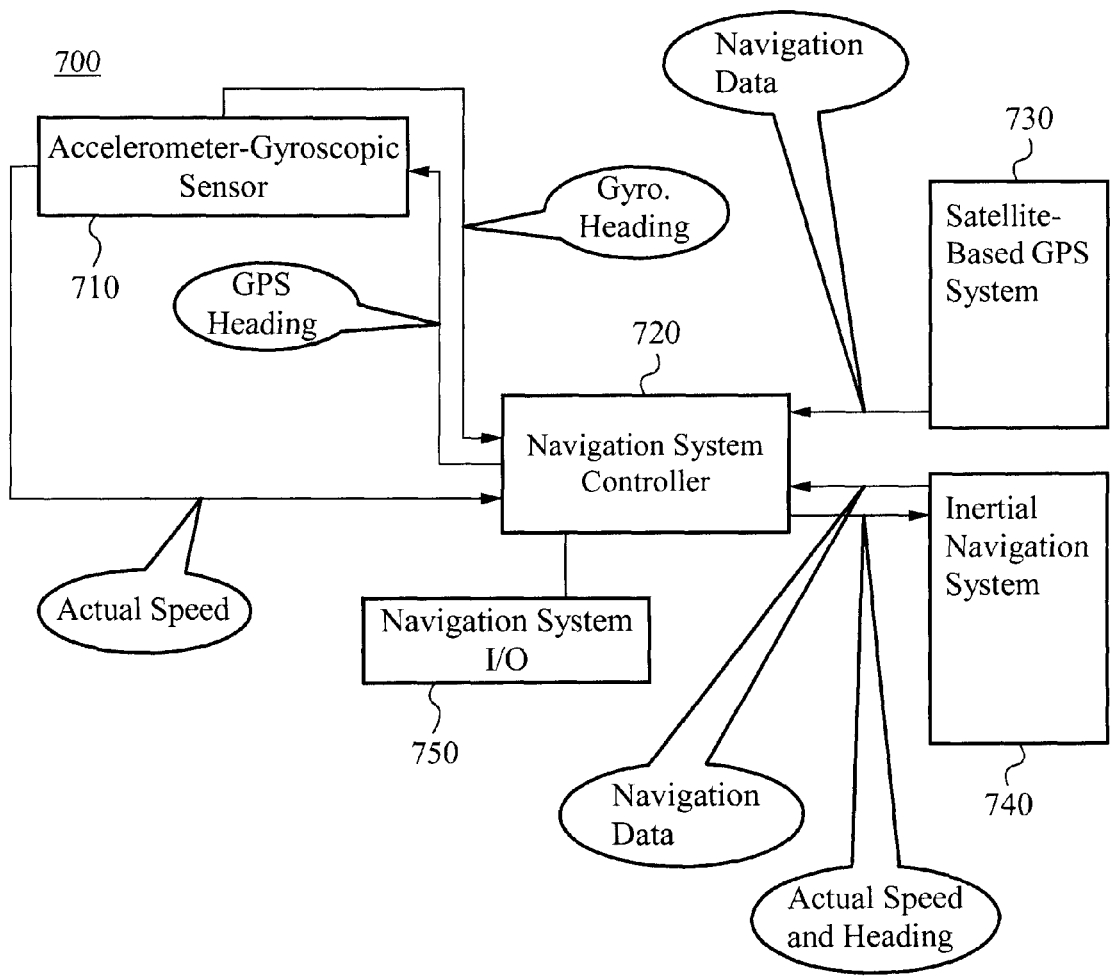
FIG. 7 illustrates a navigation system in accordance with an embodiment of the present invention.

Because velocity, or speed and heading are the raw elements required for inertial navigation systems. In the system 700 shown in FIG. 7, the accelerometer-gyroscopic sensor 710 provides actual speed and heading information as an output to a navigation system controller 720. The navigation system controller 720, which normally provides navigation data from a global positioning system (GPS) 730 directly to the navigation system input/output (I/O) 750, incorporates heading information from the accelerometer-gyroscopic sensor 710 during periods of connection loss with the GPS satellite system. In return for providing the heading data to the inertial navigation system 740, the navigation controller receives navigation data from the inertial system to supplement or replace its GPS data.

In some embodiments, the navigation system controller 720 also provides GPS heading data back to the accelerometer-gyroscopic sensor 710 to permit re-referencing of the gyroscopes contained therein. Continuous referencing and re-referencing of the horizontally mounted gyroscope utilize GPS heading values while satellite signals are acquired. Once satellite signals are lost gyroscopic heading values take priority using last known valid headings from the GPS. This method using absolute A/G values for supplementing data to the GPS data when the GPS system has lost signal will find use in many applications outside of the automotive industry.

These elements in output signal format are made available to on board GPS based navigation systems through a data port for supplementation during periods of lost or down satellite signals so that the user of a GPS navigation system sees no down time during these periods.

In another aspect, since speed or velocity can be tracked by summing positive and negative accelerations and multiplying by time, a second multiplication by time can yield distance, which is also useful in navigation.

EXAMPLE 6

Altimeter Systems

In another aspect, summing positive and negative vertical accelerations over time yields altitude. For example, an instrument, including an accelerometer-gyroscopic sensor, placed in an airplane or other flying object, contains a circuit that continuously sums over all accelerations and outputs altitude. Alternatively, a system including an accelerometer-gyroscopic sensor included in a non-flying vehicle tracks changes in altitude and outputs a signal used to vary engine performance or some other type of parameter.

This method of altitude determination has certain advantages over current methods of determining altitude which rely on either radar, pressure sensors, or GPS triangulation. Of course its accuracy in determining altitude above sea level (ASL) relies on knowledge of initial altitude, and its accuracy in determining altitude above ground level (AGL) relies on terrain maps or something similar. Since this type of instrument would reveal nothing about a changing ground level below an aircraft, any aircraft equipped with it would still require a radar altimeter for determining AGL on instrument approaches that require such.

EXAMPLE 7

Dynamic Suspension Adjustment Systems

In some embodiments of this invention, outputs from the sensing of lateral acceleration are used to adjust suspension systems by stiffening outside suspension and/or loosening inside suspension of moving vehicles.

When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

An anti-rollover device 400 is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

In other embodiments, simple lateral acceleration is provided to a suspension control system.

EXAMPLE 8

System for Turning Off an Idling Engine

Figure 10:
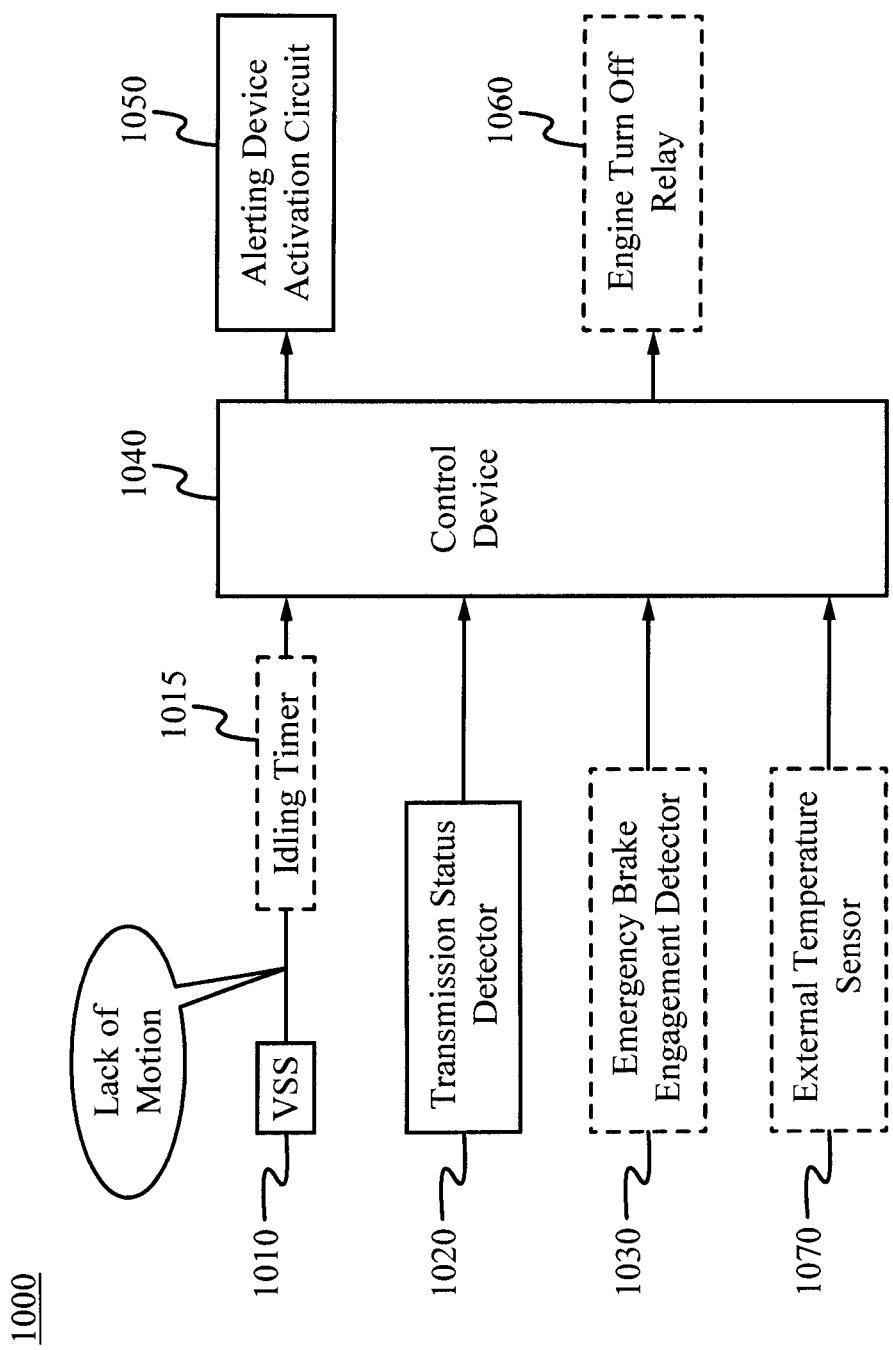
FIG. 10 is a schematic view illustrating the components of a vehicle monitoring system, warning drivers of a subject vehicle's stationary status and turning off an idling engine, in accordance with some embodiments of the present invention.

In further embodiments, a vehicle speed sensor (VSS) 1010 such as described above, is configured to sense a lack of motion of a vehicle. FIG. 10 is a schematic view illustrating the components of a vehicle monitoring system 1000, warning other drivers of the stationary status of a vehicle and turning off the engine after the vehicle has been stationary for a period of time. The vehicle monitoring system 1000 comprises a VSS 1010, an idling timer 1015, a transmission status detector 1020 and a control device 1040. In some embodiments, the idling timer 1015 is a distinct microprocessor coupled to the VSS 1010 and the control device 1040. In some embodiments, the idling timer 1015 is a microprocessor comprised within the control device 1040. The VSS 1010 emits a periodic function with a frequency corresponding to a motion status of the vehicle and sends a signal to the idling timer 1015 or the control device 1040. The transmission status detector 1020 is also coupled to the control device 1040 and detects whether the transmission is in park or neutral and sends a signal to the control device 1040, as indicated above. In some embodiments, the system comprises an emergency brake detector 1030, which is coupled to the control device 1040 and sends a signal to the control device 1040 corresponding to the engagement of the emergency brake. In some embodiments, the system comprises an external temperature sensor 1070, which is coupled to the control device 1040 and sends a signal to the control device corresponding to the temperature of the external operating environment. In some embodiments, the control device 1040 only turns off the vehicle if the external temperature is above a programmed value. In some embodiments, the external temperature sensor 1070 only sends a signal if the external temperature is above a programmed value.

After receiving a signal that the vehicle is stationary, the control device 1040 activates an alerting device to signal to other drivers that the vehicle is stationary and the idling timer 1015 is also activated. In some embodiments, the alerting device is a rear facing amber light, which warns following vehicles of the stationary status of the subject vehicle. In some embodiments, the idling timer 1015 is a microprocessor comprised within the control device 1040 such that the control device activates the timer. Once the timer reaches a pre-programmed period, the idling timer 1015 sends a signal to the control device 1040. The control device 1040 processes the input signal it receives from the idling timer 1015 and the transmission status detector 1020 and decides whether to turn off the engine of the vehicle. In some embodiments, the control device 1040 only turns off the vehicle if the vehicle is stationary and the transmission is in park. In some embodiments, the emergency brake engagement detector 1030 additionally sends a signal to the control device 1040. In these embodiments, the control device 1040 only turns off the vehicle if the emergency brake is additionally engaged, although the transmission may be in park or neutral. In further embodiments, the external temperature sensor 1070 sends a signal to the control device 1040. In these embodiments, the control device 1040 only turns off the vehicle if the external temperature is above a programmed value. In some embodiments, the external temperature sensor 1070 only sends a signal if the external temperature is above a programmed value.

The idling timer 1015, is configured to send a de-activation signal after the timer has reached the end of its pre-programmed period. In some embodiments, the idling timer 1015 is configured to reach the end of its pre-programmed period after some predetermined period of time, such as 1, 3, 6 or 9 minutes. In other embodiments, the idling timer 1015 is configured to reach its pre-programmed period of time after some other period of time.

After the idling timer 1015 has reached the end of its pre-programmed period of time, a variety of signals and types of signals are sent to turn off the engine. In some embodiments, a logic high or logic low signal is sent directly to the control device 1040, which turns off the engine. In other embodiments, a 12V signal is sent to a relay which resides in series with the ignition system. Receiving the 12V signal activates the relay and disengages the ignition. In further embodiments, additional signals are sent to relays or other such devices to turn off a lighting system or other accessory equipment.

In some embodiments, additional safety features such as redundant queries confirming "park-status" are included. The safety features include querying emergency brake status, transmission engagement status and foot-pedal brake status. In these embodiments, signals to turn off the engine are delayed until such "park-status" is confirmed.

Figure 11:
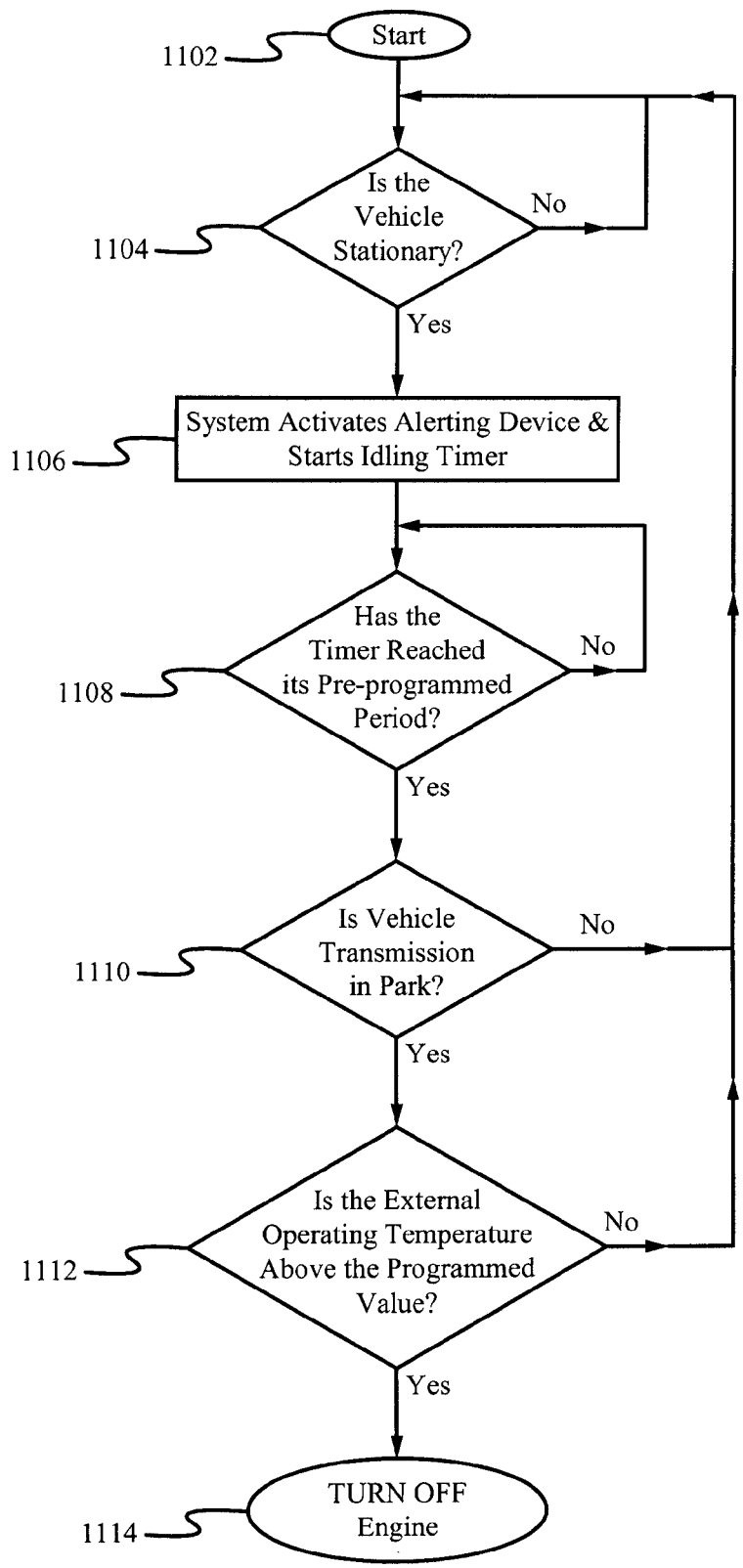
FIG. 11 illustrates a flow chart of a system to automatically turn off an idling engine in accordance with some embodiments of the present invention.

FIG. 11 illustrates the process used to turn off an idling vehicle. The process of FIG. 11 starts at the step 1102. At the step 1104, the system determines whether the vehicle is stationary based on output from the VSS. If the vehicle is stationary, then at the step 1106, an alerting device to warn following vehicles of the stationary status and an idling timer are activated. As discussed above, the idling timer 1015 is configured to run for a pre-programmed period of time. At the step 1108, the system determines whether the idling timer 1015 has run for its pre-programmed period. In some embodiments, the idling timer 1015 sends a signal to the control device 1040 when it has run for its pre-programmed period. If the timer has reached the end of its pre-programmed period, then the system proceeds to the step 1110. At the step 1110, the system queries the vehicle's transmission status based on input from the transmission status detector 1020 to the control device 1040 (FIG. 10). In some embodiments, the system queries whether the vehicle's transmission is in park. In some embodiments, the system queries whether the vehicle's transmission is in neutral or park. When the system queries whether the vehicle's transmission is in neutral, the system also queries whether the emergency brake is engaged based on input from the emergency brake engagement detector 1030 to the control device 1040 (FIG. 10). In further embodiments, the system separately queries whether the emergency brake is engaged based on input from the emergency brake engagement detector 1030 to the control device 1040. If at the step 1110 the vehicle's transmission is in park, then the system proceeds to the step 1112. At the step 1112, the system queries the temperature of the external operating environment. If at the step 1112, the temperature is at or below the programmed temperature, then a signal is not sent to turn off the engine and the engine is allowed to idle. The engine is allowed to idle such that a taxi-driver or other vehicle operator is able to allow the vehicle to run on a cold day while they are waiting for a fare or in other comparable situations. If at the step 1112, the temperature is above the programmed temperature, a signal is sent to turn off the engine and the process ends at the step 1114. In some embodiments, additional signals are sent at the step 1114 to relays or other such devices to turn off a lighting system or other accessory equipment.

In some embodiments, the process illustrated in FIG. 11 further comprises redundant queries confirming the "park-status" of the vehicle. These include querying the emergency brake status, querying the transmission engagement status and querying the foot-pedal brake status. In these embodiments, a signal sent to turn off the engine is delayed until such "park-status" is confirmed.

Embodiments of the invention provide the driver of a subject vehicle a system that causes an idling engine to turn off whose vehicle has been stationary for more than a certain amount of time, whose transmission is in park or neutral with the emergency brake activated and where the outside temperature is above a threshold value. The system is able to selectively turn off an engine according to the outside temperature and a pre-programmed time period of engine idle.

Thus, the invention is able to automatically turn off an idling engine after a variety of different time periods and at a variety of different temperatures. This is advantageous over most modern vehicles which must be manually turned off and then restarted by the vehicle's operator. A novel and unique way for corporate and governmental fleet operations as well as individual operators to save money and prevent undue environmental pollution caused by engine idle is described herein.

Of course, the present invention has additional uses that are not discussed in the embodiments above. The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent that those skilled in the art that modifications can be made to the embodiments chosen for illustration without departing from the spirit and scope of the invention.

We claim:

1. A monitoring system for a vehicle located within the vehicle, comprising:
   a. a vehicle speed sensor configured to emit a periodic function with a frequency correlated to a stationary motion status of the vehicle;
   b. a transmission status detector to detect a transmission status of the vehicle;
   c. a control device coupled to the vehicle speed sensor and the transmission status detector, wherein the vehicle speed sensor and the transmission status detector send a signal to the control device and the control device operates in a manner dependent on the separate stationary motion status signal from the vehicle speed sensor and the signal from the transmission status detector; and
   d. idling timer which is activated after receiving a frequency correlated to a stationary status of the vehicle and configured to send a de-activation signal once the timer has expired, wherein the de-activation signal is sent to the control device, and in response to the de-activation signal, the control device turns off the vehicle's engine.

2. The system of claim 1, further comprising an alerting device capable of warning other drivers of a stationary status of the vehicle.

3. The system of claim 1, wherein the idling timer is a distinct microprocessor coupled to the vehicle speed sensor and the control device or a microprocessor comprised within the control device.

4. The system of claim 1, wherein the idling timer is programmed to expire after a predetermined period of time.

5. The system of claim 1, wherein the de-activation signal further turns off a lighting system of the vehicle or other accessory equipment.

6. The system of claim 1, further comprising an emergency brake engagement detector to detect engagement of the emergency brake, wherein the emergency brake engagement detector is coupled to the control device to send a signal to the control device, and further wherein the control device operates in a manner dependent on the motion status of the vehicle, the transmission status of the vehicle and the emergency brake engagement status of the vehicle.

7. The system of claim 6, further comprising an external temperature sensor to detect temperature of the external operating environment, wherein the external temperature sensor is coupled to the control device to send a signal to the control device and the control device operates in a manner dependent on the motion status of the vehicle, the transmission status of the vehicle, the emergency brake engagement status of the vehicle and the temperature of the external operating environment.

8. The system of claim 2, wherein upon receiving a signal that the vehicle is stationary, the control device activates the alerting device to warn following drivers that the vehicle is stationary.

9. The system of claim 8, wherein the alerting device is a rear facing amber light.

10. The system of claim 1, wherein the de-activation signal is only sent if the vehicle is stationary and the transmission is in park.

11. The system of claim 6, wherein the de-activation signal is only sent if the vehicle is stationary and the emergency brake is engaged.

12. A method of automatically turning off an idling engine of a vehicle, comprising:
   a. sensing a stationary status of the vehicle;
   b. activating an idling timer, with a deactivation time window; and
   c. detecting a transmission park-status of the vehicle;
   wherein if the vehicle is stationary the idling timer is activated, wherein the idling timer is configured to send a de-activation signal to turn off the engine once the deactivation time window has expired and the transmission park-status of the vehicle is confirmed, further wherein the idling timer is programmed to expire after a predetermined period of time.

13. The method of claim 12, further comprising activating an alert device to alert other drivers that the vehicle is stationary, wherein if the vehicle is stationary, the alert device to alert other drivers that the vehicle is stationary is activated.

14. The method of claim 12, further comprising an emergency brake engagement detector to detect the engagement of the emergency brake, wherein the deactivation message is not sent until the engagement of the emergency brake is confirmed.

15. The method of claim 12, further comprising an external temperature sensor to detect temperature of the external operating environment, wherein the deactivation signal is not sent unless the external temperature is above a programmed value.

16. The method of claim 13, wherein the alerting device is a rear facing amber light.

17. The method of claim 12, wherein the de-activation signal is only sent if the vehicle is stationary and the transmission is in park.

18. The method of claim 12, wherein the idling timer is a distinct microprocessor coupled to the vehicle speed sensor and the control device or a microprocessor comprised within the control device.

19. The method of claim 12, wherein the de-activation signal is sent to the control device, and in response to the deactivation signal, the control device turns off the vehicle's engine.

20. The method of claim 19, wherein the de-activation signal further turns off a lighting system of the vehicle or other accessory equipment.

21. A system located within a vehicle to automatically turn off an idling engine, comprising:
   a. a vehicle speed sensor configured to emit a periodic function with a frequency correlated to a stationary status of the vehicle;
   b. a transmission status detector to detect a transmission status of the vehicle;
   c. an emergency brake engagement detector to detect engagement of the emergency brake;
   d. an external temperature sensor to detect temperature of the external operating environment;
   e. an alerting device capable of warning other drivers of a stationary status of the vehicle;
   f. an idling timer which is activated after receiving a frequency correlated to the stationary status of the vehicle and programmed to send a de-activation signal once the timer has reached the end of its pre-programmed period; and
   g. a control device coupled to the vehicle speed sensor, the transmission status detector, the emergency brake engagement detector, the external temperature sensor, the alerting device and the idling timer, wherein the vehicle speed sensor, the transmission status detector, the emergency brake engagement detector, the external temperature sensor and the idling timer send a signal to the control device and the control device operates in a manner dependent on the stationary status of the vehicle, the transmission status of the vehicle, the emergency brake status of the vehicle, the temperature of the external operating environment and the expiration of the idling timer.

22. The system of claim 21, wherein the alerting device is a rear facing amber light.

23. The system of claim 21, wherein the de-activation signal is only sent if the vehicle is stationary and the transmission is in park.

24. The system of claim 21, wherein the de-activation signal is only sent if the vehicle is stationary and the emergency brake is engaged.

25. The system of claim 21, wherein the idling timer is a distinct microprocessor coupled to the vehicle speed sensor and the control device or a microprocessor comprised within the control device.

26. The system of claim 21, wherein the idling timer is programmed to expire after a predetermined period of time.

27. The system of claim 21, wherein the de-activation signal is sent to the control device, and in response to the de-activation signal, the control device turns off the vehicle's engine.

28. The system of claim 27, wherein the de-activation signal further turns off a lighting system of the vehicle or other accessory equipment.

\* \* \* \* \*